(12) United States Patent
Fukazawa

(10) Patent No.: US 11,315,564 B2
(45) Date of Patent: Apr. 26, 2022

(54) WIRELESS DEVICE

(71) Applicant: JVCKENWOOD Corporation, Yokohama (JP)

(72) Inventor: Masaomi Fukazawa, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 100 days.

(21) Appl. No.: 16/798,461

(22) Filed: Feb. 24, 2020

(65) Prior Publication Data

US 2020/0294501 A1 Sep. 17, 2020

(30) Foreign Application Priority Data

Mar. 13, 2019 (JP) ............................. JP2019-045366

(51) Int. Cl.
| | |
|---|---|
| *G10L 21/00* | (2013.01) |
| *G10L 15/22* | (2006.01) |
| *G06F 3/16* | (2006.01) |
| *H04M 3/42* | (2006.01) |

(52) U.S. Cl.
CPC .............. *G10L 15/22* (2013.01); *G06F 3/167* (2013.01); *H04M 3/42221* (2013.01); *G10L 2015/223* (2013.01)

(58) Field of Classification Search
CPC ... G10L 15/22; G10L 2015/223; G06F 3/167; H04M 3/42221; H04M 1/642; H04M 1/72424; H04M 1/72436; G08B 21/00; G08B 25/016; G08B 21/02; H04W 76/50
USPC ........................................ 704/270; 455/569.1
See application file for complete search history.

(56) References Cited

U.S. PATENT DOCUMENTS

| | | | | |
|---|---|---|---|---|
| 6,941,161 B1* | 9/2005 | Bobisuthi | ........... | H04M 1/6008 455/569.1 |
| 2004/0203622 A1* | 10/2004 | Esque | ................... | H04W 76/50 455/412.1 |
| 2011/0230161 A1* | 9/2011 | Newman | ........... | H04M 1/72424 455/404.1 |
| 2012/0282884 A1* | 11/2012 | Sun | ................... | H04M 1/72436 455/404.2 |
| 2015/0379849 A1* | 12/2015 | Agrawal | ................ | G08B 21/02 340/328 |

(Continued)

FOREIGN PATENT DOCUMENTS

| | | |
|---|---|---|
| JP | 06-030158 | 2/1994 |
| JP | 2000-312266 | 11/2000 |

(Continued)

*Primary Examiner* — Md S Elahee
(74) *Attorney, Agent, or Firm* — Amin, Turocy & Watson, LLP

(57) ABSTRACT

A wireless device having an action mode that automatically repeats, at a fixed temporal interval, a sending action of sending a voice and a receiving action of receiving the voice includes a voice recorder configured to record the voice therein when the voice is input from a microphone during execution of the action mode, a sending controller configured to send the voice input in the sending action during the execution of the action mode, and a recording controller configured to control recording in the voice recorder, wherein the sending controller is further configured to send the voice recorded in the voice recorder when the voice is not input from the microphone in the sending action.

8 Claims, 7 Drawing Sheets

(56) References Cited

U.S. PATENT DOCUMENTS

2018/0158311 A1* 6/2018 Yan .................. G08B 25/016
2019/0297180 A1* 9/2019 Jia .................... H04M 1/642

FOREIGN PATENT DOCUMENTS

JP          2000312266 A  * 11/2000
JP          2003346252 A  * 12/2003  ............. G08B 21/00

* cited by examiner

WIRELESS DEVICE

CROSS-REFERENCE TO RELATED APPLICATION

This application claims priority from Japanese Application No. 2019-045366, filed on Mar. 13, 2019, the contents of which are incorporated by reference herein in its entirety.

FIELD

The present application relates to a wireless device having an action mode that automatically repeats, at a fixed temporal interval, a sending action of sending a voice and a receiving action of receiving a voice.

BACKGROUND

In general, a wireless device including a push-to-talk (PTT) switch is known. The wireless device of this type awaits a reception of a voice from another wireless device in a state where the PTT switch is not turned on, and can send a voice input from a microphone to the other wireless device when the PTT switch is turned on. Some wireless devices of this type include an emergency call function. Such wireless devices can automatically and alternately repeat a sending action of voice and a receiving action of voice at a preset temporal interval, and enable a user to send a voice without turning on the PTT switch during the sending action of voice, so as to perform conversation. Meanwhile, as another technology regarding the emergency call function, a technology regarding a case where a sender is unable to speak is described in Japanese Laid-open Patent Publication No. 2000-312266 and No. 6-30158. Japanese Laid-open Patent Publication No. 2000-312266 and No. 6-30158 describe a technique that sends a voice recorded in advance at a time of an emergency call on an assumption that a sender is unable to speak in a case of emergency.

In the technique described in Japanese Laid-open Patent Publication No. 2000-312266 and No. 6-30158, information recorded in advance is sent in the case where the sender is unable to speak. However, it is desirable to send the latest information in a case of emergency. In other words, the most recent speech of the sender is required to be sent to a receiver.

SUMMARY

A wireless device is disclosed.

According to one aspect, there is provided a wireless device having an action mode that automatically repeats, at a fixed temporal interval, a sending action of sending a voice and a receiving action of receiving the voice comprising: a voice recorder configured to record the voice therein when the voice is input from a microphone during execution of the action mode; a sending controller configured to send the voice input in the sending action during the execution of the action mode; and a recording controller configured to control recording in the voice recorder, wherein the sending controller is further configured to send the voice recorded in the voice recorder when the voice is not input from the microphone in the sending action.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

The following describes embodiments of the present application based on the accompanying drawings. Note that the present application is not limited to the embodiments. In addition, elements in the embodiments include those that can be replaced and facilitated by a person skilled in the art, or those that are substantially identical.

First Embodiment

Figure 1:
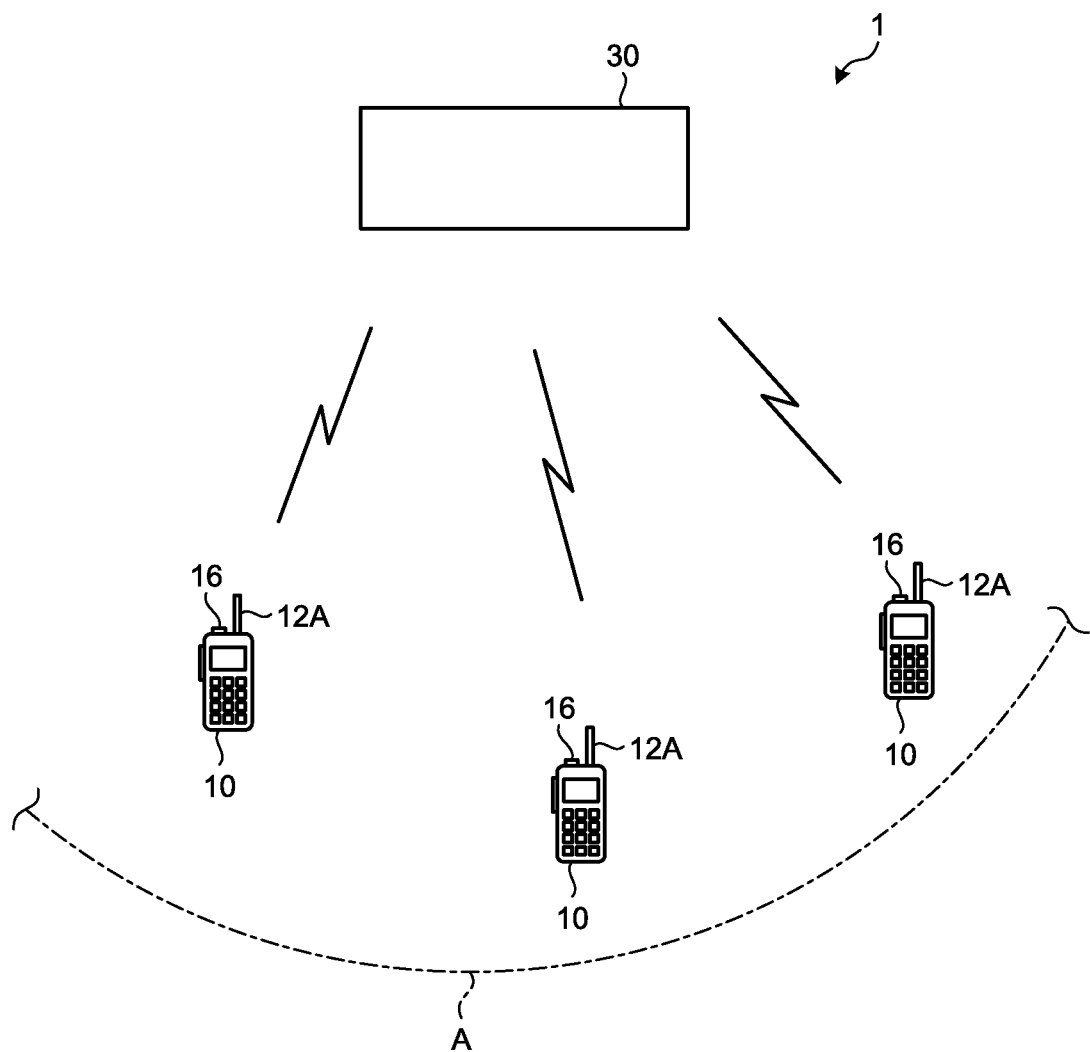
FIG. 1 is a schematic configuration diagram illustrating a wireless communication system including wireless devices according to a first embodiment of the present application.
Figure 2:
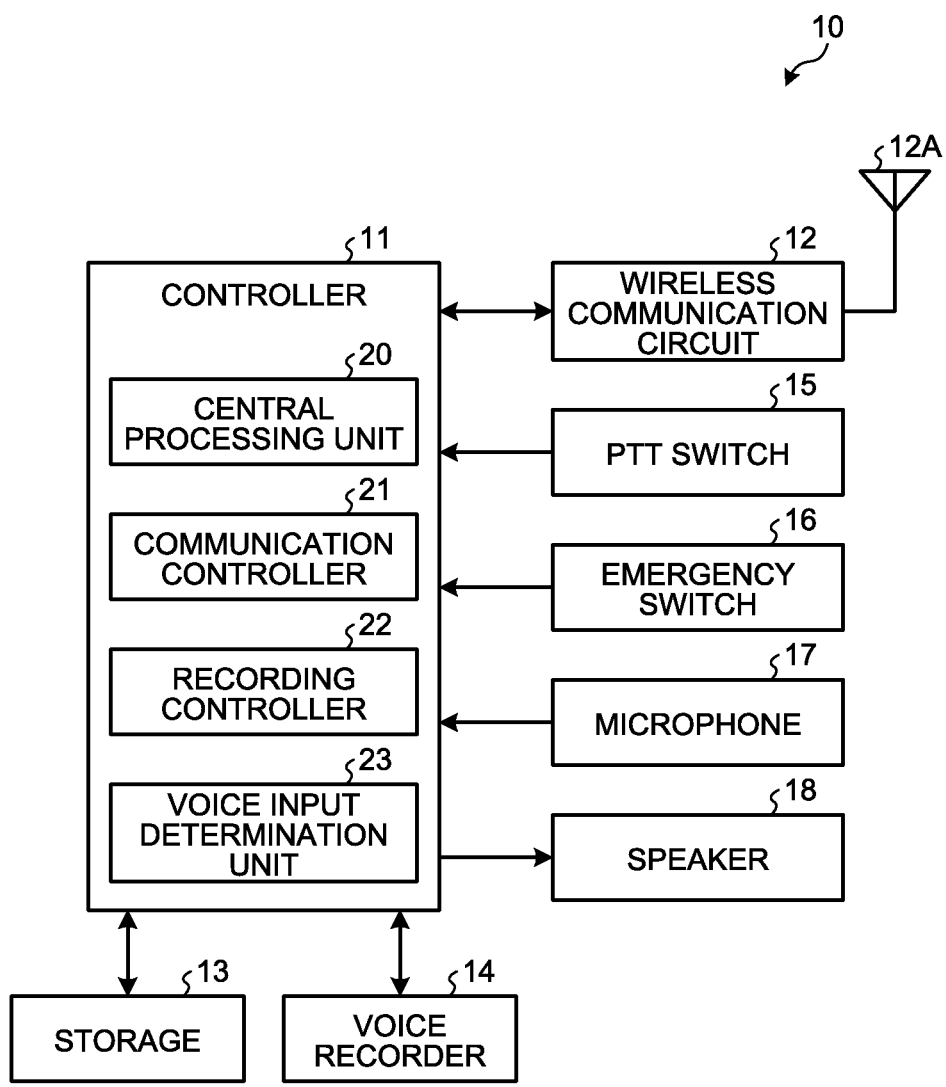
FIG. 2 is a functional block diagram illustrating the wireless device.

FIG. 1 is a schematic configuration diagram illustrating a wireless communication system 1 including wireless devices 10 according to a first embodiment of the present application. FIG. 2 is a functional block diagram illustrating the wireless device 10. As illustrated in FIG. 1, the wireless communication system 1 includes the wireless devices 10 (three in FIG. 1) and a base station (external apparatus) 30 that is connected to the wireless devices 10. The wireless communication system 1 may include a relay station (not illustrated) that performs relaying between the wireless devices 10 and the base station 30. The base station 30 sends a signal including voice data received from any one of the wireless devices 10 to another one of the wireless devices 10 which is present in a communication range A. The base station 30 can also send a signal for controlling an action of the wireless device 10 to the wireless devices 10 present in the communication range A. The wireless device 10 performs, for example, half-duplex wireless communication via the base station 30. The half-duplex wireless communication is a form of wireless communication in which a data sending action and a data receiving action cannot simultaneously be performed and only either thereof can be performed in a time dividing manner. Although in the example of FIG. 1, the wireless communication system 1 includes the three wireless devices 10, the number of wireless devices 10 included in the wireless communication system 1 is not limited to three but may be any desired number. Although FIG. 1 illustrates an example in which the wireless devices 10 communicate with one another via the base station 30 or the relay station, the example includes a form in which the wireless devices 10 directly communicate with one another not via the base station 30 or the relay station.

The wireless device 10 is a mobile wireless device, and a user of the wireless device 10 can move within the communication range A while the user is communicating. As illustrated in FIG. 2, the wireless device 10 includes a controller 11, a wireless communication circuit 12, a storage 13, a voice recorder 14, a PTT switch 15, an emergency switch 16, a microphone 17, and a speaker 18. The wireless device 10 according to the first embodiment awaits reception of a voice from another wireless device 10 in a state where the PTT switch 15 is not turned on. The wireless device 10 is configured to execute a normal action mode in which the wireless device 10 sends an input voice to the other wireless device 10 when the PTT switch 15 is turned on, and an emergency call mode in which, when the emergency switch 16 is turned on, an action of sending a voice and an action of receiving a voice are automatically repeated at a fixed temporal interval. In the emergency call mode, the PTT switch 15 does not need to be turned on each time of sending, thereby making it possible to easily and reliably transmit a sender's emergency situation to the receiver.

The controller 11 can be composed of a microprocessor or microcomputer. The controller 11 has, as a functional internal configuration, a central processing unit 20, a communication controller (sending controller) 21, a recording controller 22, and a voice input determination unit 23. The central processing unit 20, the communication controller 21, the recording controller 22, and the voice input determination unit 23 may be configured by software (computer program) or hardware. Further, these units 20 to 23 may be configured by software and hardware in combination.

The central processing unit 20 controls an overall action of the wireless device 10. For example, when the emergency switch 16 is turned on, the central processing unit 20 enter an emergency call mode to control the action of the wireless device 10. The communication controller 21 controls an action of the wireless communication circuit 12. For example, in the emergency call mode, the communication controller 21 controls the wireless communication circuit 12 to automatically repeat, at a fixed temporal interval, a sending action of sending a voice and a receiving action of receiving a voice. In the emergency call mode, the recording controller 22 controls an action of recording (storing) a voice input from the microphone 17 in the voice recorder 14 or an action of deleting a voice input from the microphone 17 from the voice recorder 14. The voice input determination unit 23 determines whether the voice is input from the microphone 17. Specifically, when detecting a voice having level equal to or larger than a predetermined threshold, the voice input determination unit 23 determines that the voice is input from the microphone 17.

The wireless communication circuit 12 is a circuit that processes wireless sending and receiving of voice data with respect to the base station 30 and is connected to an antenna 12A to send and receive the voice data. The storage 13 stores various types of data and action programs. The storage 13 stores a normal action mode program and an emergency call mode program. The voice recorder 14 records therein (stores) a voice input from the microphone 17. Although the storage 13 and the voice recorder 14 can use semiconductor memory devices such as flash memories, the storage 13 and the voice recorder 14 may also use storage devices such as hard disk drives (HDD). In addition, the storage 13 and the voice recorder 14 may be separately formed or may be integrally formed with the mode programs and the voice being stored in separate areas.

The PTT switch 15 is a push button with which the wireless device 10 enters a sending state for communicating with the other wireless device 10. The emergency switch 16 is a push button with which the wireless device 10 enters the emergency call mode that automatically repeats, at a fixed temporal interval, the sending action of sending the voice and the receiving action of receiving the voice data to and from the base station 30. The emergency switch 16 is provided to a location in which the emergency switch 16 is not operated at normal times mistakenly. The emergency switch 16 is disposed in parallel with the antenna 12A on a top surface of the wireless device 10 illustrated in FIG. 1. The microphone 17 transduces the input voice into an electric signal. The speaker 18 transduces the received electric signal into a voice and outputs the voice.

Figure 3:
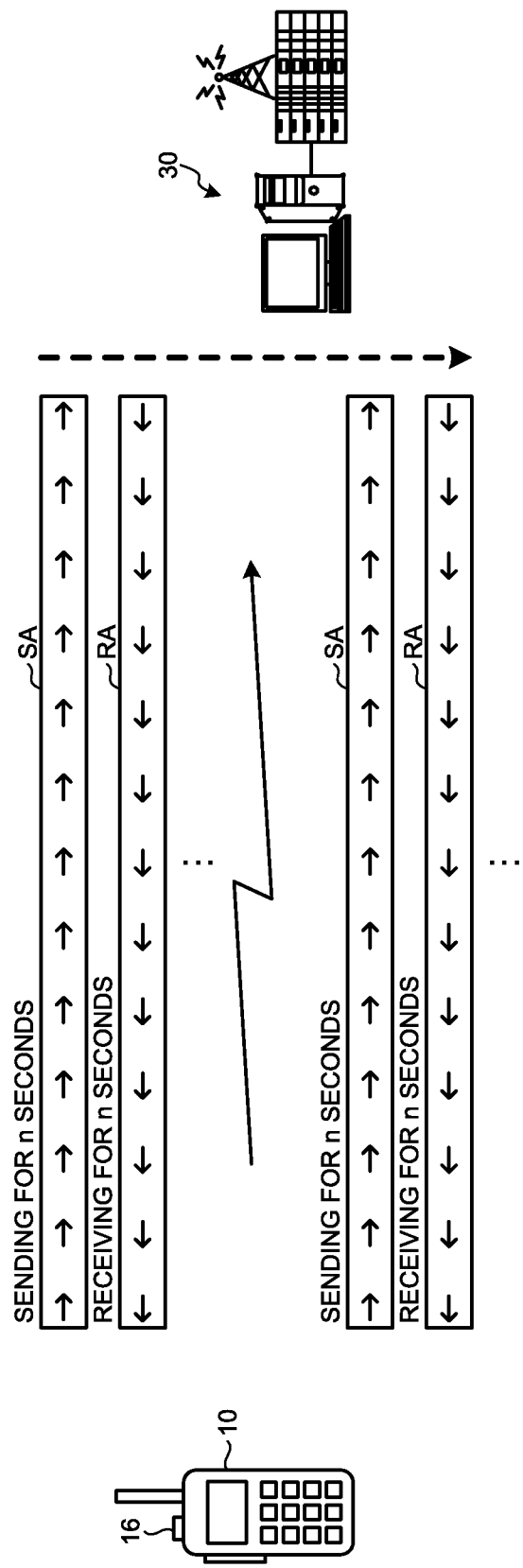
FIG. 3 is a diagram schematically illustrating a basic action of the wireless device in a case of emergency call mode.
Figure 4:
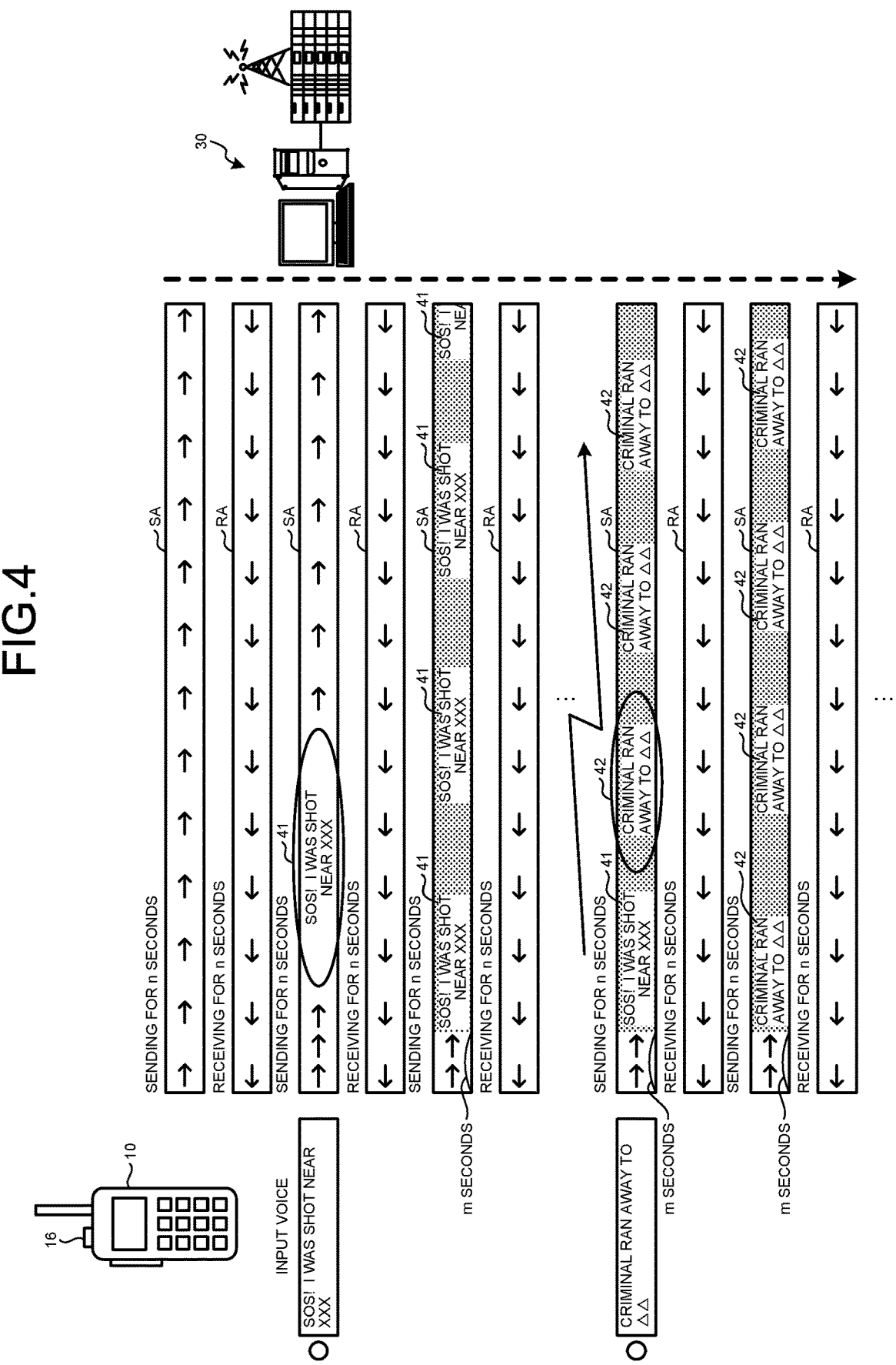
FIG. 4 is a diagram schematically illustrating an action of the wireless device when a voice is input.
Figure 5:
FIG. 5 is a diagram schematically illustrating voice data stored in a voice recorder.
Figure 6:
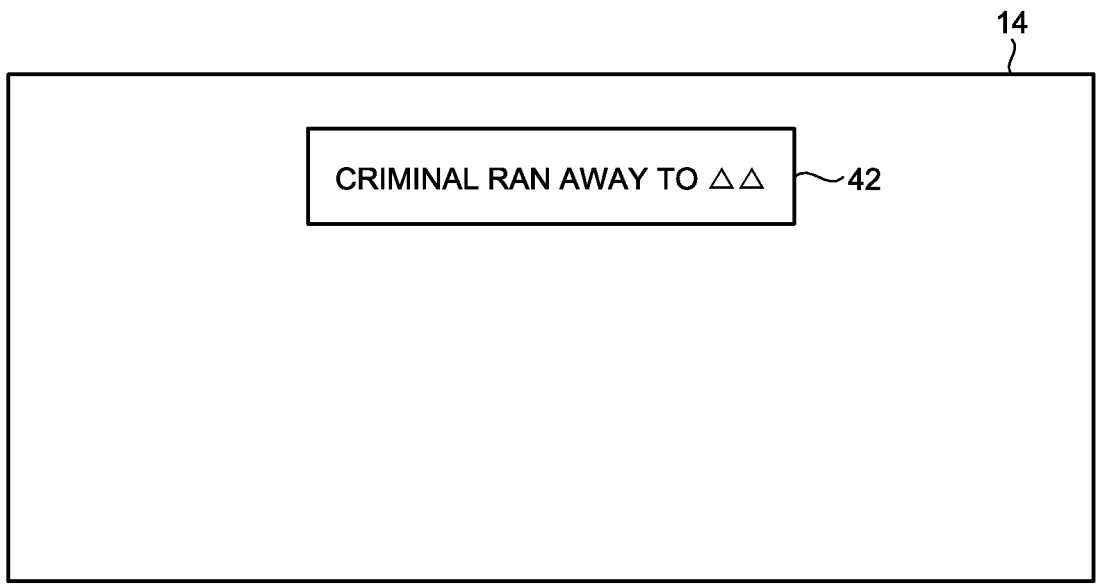
FIG. 6 is a diagram schematically illustrating voice data stored in the voice recorder.

Next, an action of the wireless device 10 when the emergency call mode is executed is described below. FIG. 3 is a diagram schematically illustrating a basic action of the wireless device 10 in the emergency call mode. FIG. 4 is a diagram schematically illustrating an action of the wireless device 10 when a voice is input to the wireless device 10. FIGS. 5 and 6 are diagram schematically illustrating pieces of voice data stored in the voice recorder 14. In the first embodiment a user of the wireless device 10 is, for example, a police officer, and an emergency situation is assumed to be a situation in which the police officer was shot and injured.

As described above, by turning on the emergency switch 16 of the wireless device 10, the central processing unit 20 executes the emergency call mode program stored in the storage 13 to enter the emergency call mode, and controls the action of the wireless device 10. Specifically, as illustrated in FIG. 3, the wireless device 10 (communication controller 21) automatically and alternately repeats a sending action SA that sends a voice to the base station 30 for n seconds (fixed time) and a receiving action RA that receives a voice from the base station 30 or from the other wireless device 10 (FIG. 1) via the base station 30 for n seconds (fixed time). In this manner, since in the emergency call mode the sending action SA and the receiving action RA are alternately repeated, the sending action SA is periodically started at an interval of n seconds. The time (n seconds) for implementing the sending action SA and the time for implementing the receiving action RA can respectively be set to any desired seconds. For example, the time of the sending action SA may be set to be longer than the time of the receiving action RA.

Execution of the emergency call mode allows the voice input determination unit 23 to monitor whether a voice is input from the microphone 17 at the timing (during the time) of the sending action SA. Specifically, when detecting a voice having level equal to or larger than a predetermined threshold, the voice input determination unit 23 determines that the voice is input from the microphone 17. With this configuration, noise around the wireless device 10 can be prevented from being mistakenly input, thereby making it possible to determine whether a voice is input from the user.

As illustrated in FIG. 4, in a case where in the sending action SA, the voice "SOS! I WAS SHOT NEAR XXX" was input from the microphone 17, the wireless device 10 (communication controller 21) sends voice data 41 of the input voice "SOS! I WAS SHOT NEAR XXX" to the base station 30. In addition, as illustrated in FIG. 5, the wireless device 10 (recording controller 22) records the voice data 41 of the input voice "SOS! I WAS SHOT NEAR XXX" in the voice recorder 14.

In a case where the police officer is unable to speak due to injury, that is, in a case of inability to input a voice from the microphone 17, such as when the police officer was shot and injured, it is impossible for the sender (police officer) to use the wireless device 10 to transmit the situation to a receiver (base station 30, the other wireless device 10). Accordingly, in this configuration, in the following sending action SA, when it is determined that a voice is not input for a predetermined time (m seconds where m may be set to any desired value in a range of $0 \leq m < n$) from the start of this sending action SA, the wireless device 10 (communication controller 21) sends the voice data 41 recorded in the voice recorder 14. In this case, the voice data 41 is repeatedly played back and sent until the sending action SA ends. With this configuration, the user only needs to speak toward the microphone 17 at least once, thereby making it possible to easily transmit the situation of the user to the receiver while reducing a load on the user in an emergency state.

Furthermore, in a case where, in the subsequent sending action SA, the new voice "CRIMINAL RAN AWAY FOR ΔΔ" is input from the microphone 17, as illustrated in FIG. 6, the wireless device 10 (recording controller 22) records new voice data 42 of the new input voice "CRIMINAL RAN AWAY FOR ΔΔ" in the voice recorder 14 to replace (overwrite) the previously recorded voice data 41 (FIG. 5). The wireless device 10 (communication controller 21) also sends the new voice data 42 recorded in the voice recorder 14. Also in this case, the new voice data 42 is repeatedly played back and sent until the sending action SA ends. With this configuration, by quickly responding to a change in the sender's situation, the change in the sender's situation can easily be transmitted to the receiver.

In the first embodiment, when the wireless device 10 (recording controller 22) receives a predetermined action signal from the base station 30 (external apparatus), based on the received predetermined action signal, the wireless device 10 (recording controller 22) deletes at least a part of the voice data recorded in the voice recorder 14 or stops recording new voice data in the voice recorder 14. This configuration can prevent the same voice data from being repeatedly played back for a long time, or prevent the voice data recorded in the voice recorder 14 from being replaced, for example, by a loud sound occurred around the wireless device 10. In addition, by sending a sound around the wireless device 10 in real time in place of the voice data recorded in the voice recorder 14, an environment around the wireless device 10 can be confirmed. Furthermore, with an action signal received from the base station 30, the emergency call mode is turned off to enter the normal mode.

Although in the first embodiment, voice input from the microphone 17 at the timing of the sending action SA is recorded in the voice recorder 14, voice data input from the microphone 17 at the timing of the receiving action RA may be recorded in the voice recorder 14. With this configuration, voice data of a voice from the user at the timing of the receiving action RA can be recorded and sent to the base station 30. This makes it possible to reliably transmit a sender's situation to a receiver.

Second Embodiment

Figure 7:
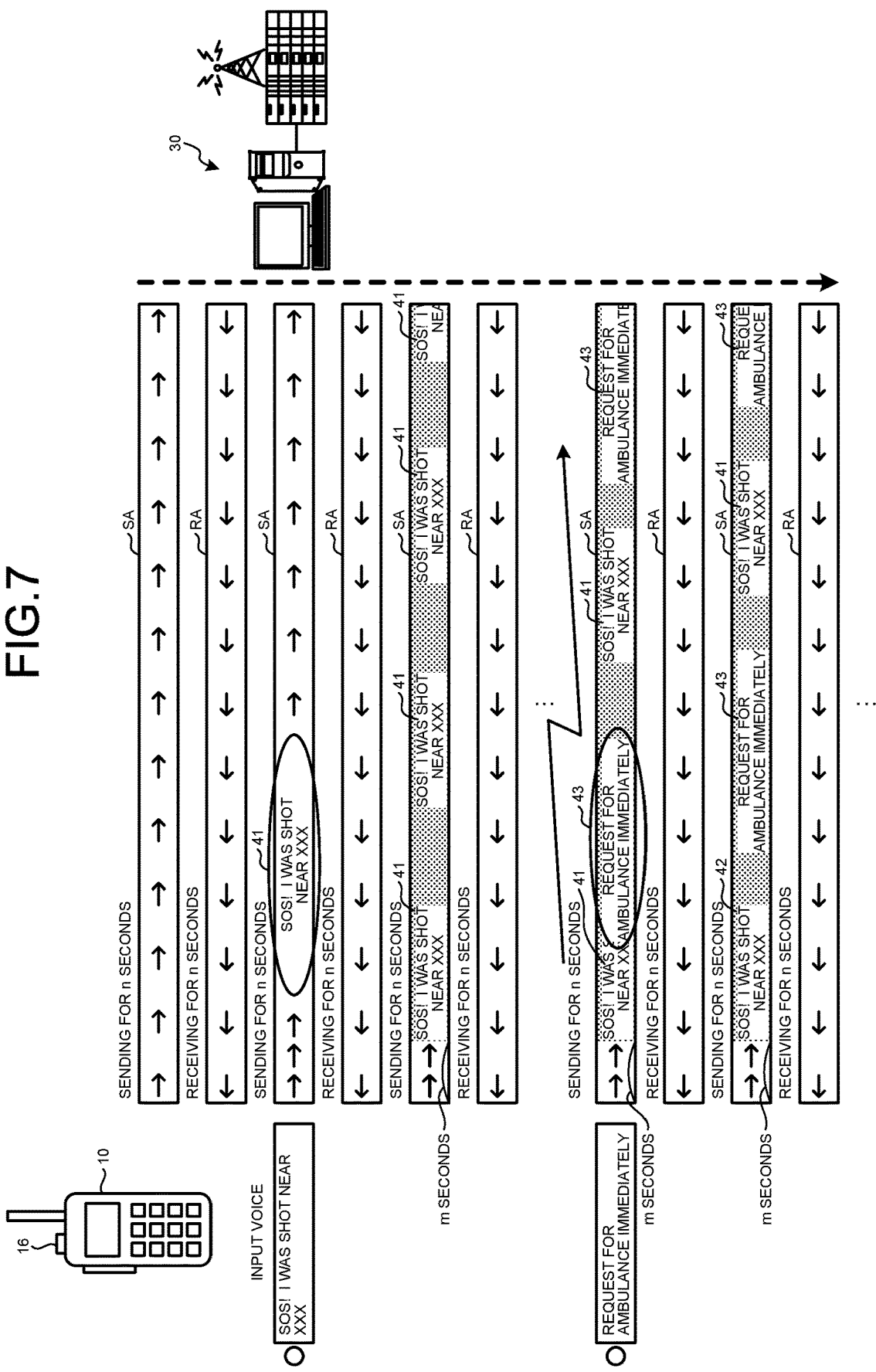
FIG. 7 is a diagram schematically illustrating an action of a wireless device according to a second embodiment of the present application.
Figure 8:
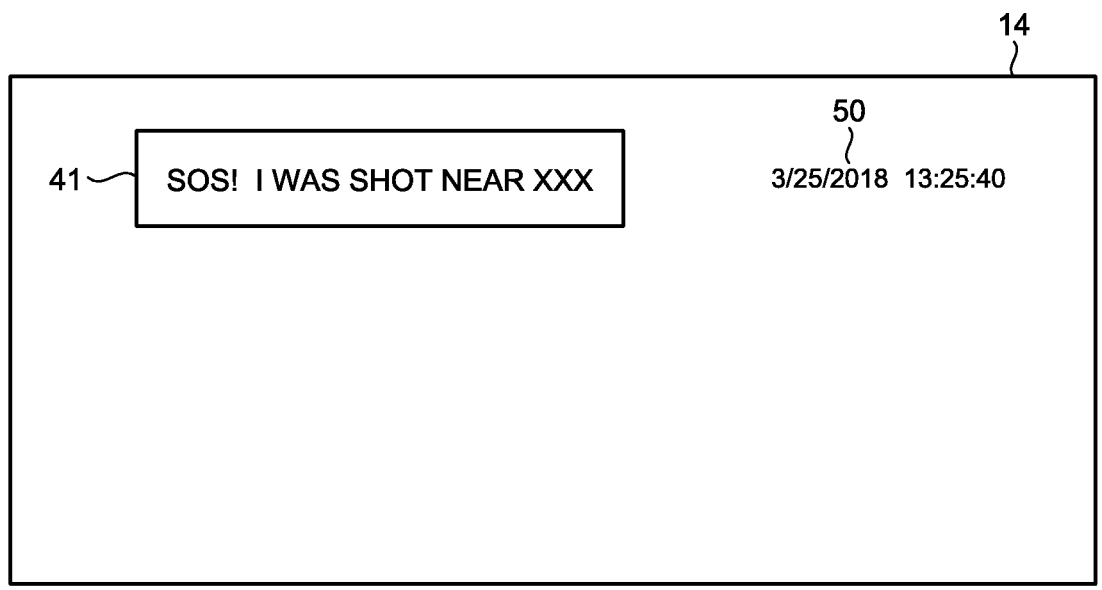
FIG. 8 is a diagram schematically illustrating voice date recorded in the voice recorder.
Figure 9:
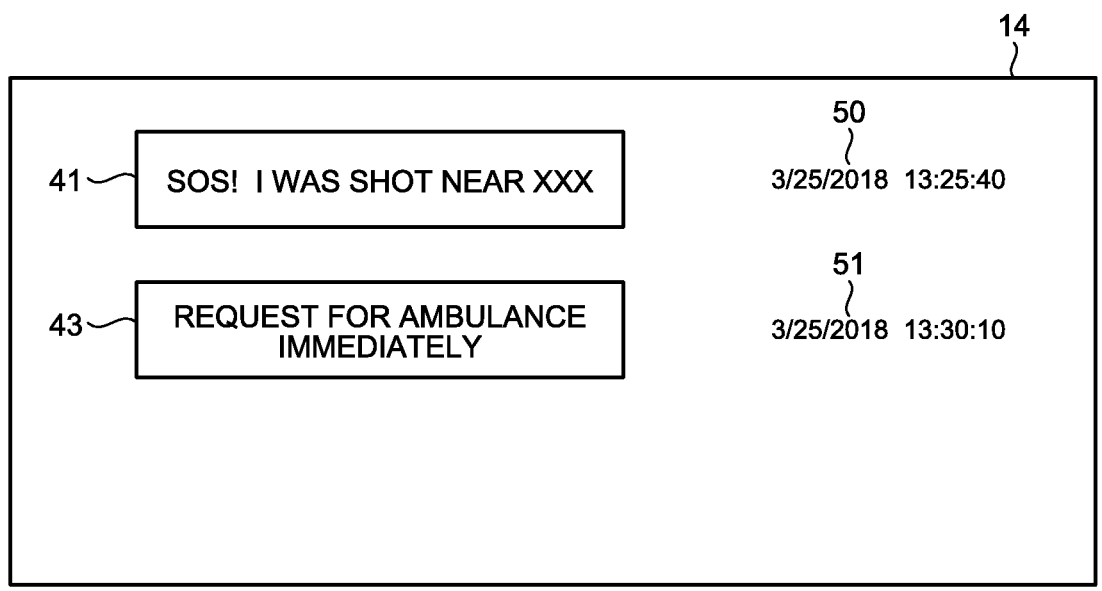
FIG. 9 is a diagram schematically illustrating voice data recorded in the voice recorder.

Next, an action of the wireless device 10 according to a second embodiment in the emergency call mode is described below. FIG. 7 is a diagram schematically illustrating the action of the wireless device 10 according to the second embodiment in the emergency call mode. FIG. 8 is a diagram schematically illustrating voice data recorded in the voice recorder. FIG. 9 is a diagram schematically illustrating voice data recorded in the voice recorder. Also in the second embodiment, the user of the wireless device 10 is a police officer, and an emergency situation is assumed to be a situation in which the police officer was shot and injured. Since the wireless device 10 according to the second embodiment has a configuration identical to the configuration of the first embodiment, its description is omitted. The second embodiment differs from the first embodiment in handling the voice data recorded in the voice recorder 14.

By turning on the emergency switch 16 of the wireless device 10, similarly to the first embodiment, the wireless device 10 (communication controller 21) automatically and alternately repeats the sending action SA that sends a voice to the base station 30 for n seconds (fixed time) and the receiving action RA that receives a voice from the other wireless device 10 (FIG. 1) via the base station 30. In addition, the voice input determination unit 23 monitors whether a voice is input from the microphone 17 at the timing of the sending action SA.

As illustrated in FIG. 7, when the voice "SOS! I WAS SHOT NEAR XXX" is input from the microphone 17 at the timing of the sending action SA, the wireless device 10 (communication controller 21) sends voice data 41 of the input voice "SOS! I WAS SHOT NEAR XXX" to the base station 30. As illustrated in FIG. 8, the wireless device 10 (recording controller 22) records, in the voice recorder 14, voice data 41 of the voice "SOS! I WAS SHOT NEAR XXX" and time data 50 of the time "3/25/2018 13:25:40" at which the voice data 41 was input, which are associated with each other. The wireless device 10 (communication controller 21) may send the time data 50 in a form of text data to the base station 30.

In the following sending action SA, it is determined that a voice is not input for a predetermined time (m seconds where m may be set to any value in a range of $0 \leq m < n$) from the start of this sending action SA, the wireless device 10 (communication controller 21) sends the voice data 41 recorded in the voice recorder 14. In this case, the voice data 41 is repeatedly played back and sent until the sending action SA ends.

In a case where the new voice "REQUEST FOR AMBULANCE IMMEDIATELY" is input from the microphone 17 in the following sending action SA, as illustrated in FIG. 8, the wireless device 10 (recording controller 22) records voice data 43 of the new voice "REQUEST FOR AMBULANCE IMMEDIATELY" in the voice recorder 14 by adding the voice data 43 to the previously recorded voice data 41. The voice data 43 of the new voice "REQUEST FOR AMBULANCE IMMEDIATELY" is recorded also in the voice recorder 14, with the voice data 43 being associated with time data 51 of the time "3/25/2018 13:30:10" at which the voice data 43 was input.

When the voice data 43, which is new data, is recorded in the voice recorder 14, the wireless device 10 (communication controller 21) sends the voice data 41 previously recorded in the voice recorder 14 and the new voice data 43. In this case, the wireless device 10 (communication controller 21) sequentially sends the voice data in the recorded order based on the time data. With this configuration, the voice data is sent in time series, thereby making it possible to easily transmit a change in the sender's situation to a receiver.

As illustrated in FIG. 7, the wireless device 10 (communication controller 21) can play back and send the previously recorded voice data 41 and the new voice data 43 until the sending action SA ends. With this configuration, a change in the sender's situation can reliably be transmitted to the receiver. Furthermore, in a case where a sum of playback times (recording times) for playing back multiple pieces of the voice data exceeds the time (n seconds) of the sending action SA, the wireless device 10 (communication controller 21) may send the pieces of the voice data without the voice data at the oldest time. With this configuration, relatively recent voice data can be sent, thereby making it possible to transmit the sender's relatively recent situation to the receiver.

Also in the second embodiment, when receiving a predetermined action signal from the base station 30 (external apparatus), the wireless device 10 (recording controller 22) deletes at least a part of the voice data recorded in the voice recorder 14 or stops recording new voice data in the voice recorder 14 based on the received action signal. In particular, as in the second embodiment, in the configuration in which multiple pieces of the voice data is repeatedly sent, by deleting the old voice data, the sender's recent situation can be shared. In addition, by sending a sound around the wireless device 10 in real time in place of the voice data recorded in the voice recorder 14, the present environment around the wireless device 10 can be confirmed. Furthermore, with the action signal from the base station 30, the emergency call mode may be turned off to allow the wireless device 10 to enter the normal mode.

Also in the second embodiment, the voice data which is input from the microphone 17 at the timing of the receiving action RA and which is associated with the time data may be recorded in the voice recorder 14. With this configuration, every piece of voice data after the emergency switch 16 is turned on can be recorded and sent to the base station 30, thus making it possible to reliably transmit a change in the sender's situation to a receiver.

As described above, the wireless device 10 according to the second embodiment is configured to be able to perform the emergency call mode that automatically repeats, at a fixed temporal interval, the sending action SA of sending the voice and the receiving action RA of receiving the voice. The wireless device 10 includes the voice recorder 14 that records the input voice in a case where the voice is input from the microphone 17 during execution of the emergency call mode, the communication controller 21 that sends the voice input in the sending action SA during the execution of the emergency call mode, and the recording controller 22 that controls the action of the voice recorder 14. The communication controller 21 sends the voice data recorded in the voice recorder 14 in a case where the voice is not input from the microphone 17 at the following sending action SA. Thus the wireless device 10 can transmit the situation of the user serving as the sender to a receiver while reducing a load on the user in a case of emergency.

According to the second embodiment, since the recording controller 22 records new voice data input from the microphone 17 to replace the voice data previously recorded in the voice recorder 14, the recording controller 22 can always send the latest voice data, thereby making it possible to transmit the latest situation of the sender to a receiver.

In addition, according to the second embodiment, since the recording controller 22 records new voice data input from the microphone 17 by adding the new voice data to the voice data previously recorded in the voice recorder 14, the recording controller 22 can send pieces of voice data, thereby making it possible to transmit a change in the sender's situation to a receiver.

According to the second embodiment, since the communication controller 21 sequentially sends the voice data recorded in the voice recorder 14 in the recorded order, the communication controller 21 can send the voice data in time series. This makes it possible to easily and reliably transmit a change in the sender's situation to a receiver.

According to the second embodiment, in a case where, in the receiving action RA during execution of the emergency call mode, a voice is input from the microphone 17, the recording controller 22 records data of the input voice in the voice recorder 14. Thus, the status of the sender other than the sending action SA can be transmitted to a receiver.

According to the second embodiment, the wireless device 10 includes the voice input determination unit 23 that determines, when detecting a voice having a level equal to or larger than a predetermined threshold is input from the microphone 17, that the voice is input from the microphone 17. Thus, noise around the wireless device 10 can be prevented from being mistakenly input, thereby making it possible to determine whether a voice is input from the user precisely.

According to the second embodiment, based on a signal from the base station 30, the recording controller 22 deletes at least a part of the voice data recorded in the voice recorder 14 or stops recording new voice data in the voice recorder 14. Thus, this makes it possible to prevent the same voice data from being repeatedly played back for a long time, or prevent the voice data recorded in the voice recorder 14 from being replaced, for example, by a loud sound occurred around the wireless device 10. Furthermore, for example, in a case where multiple pieces of the voice data are recorded and repeatedly played back, by deleting old pieces of the voice data, the most recent situation of the sender can be shared. According to the second embodiment, the central processing unit 20 cancels the emergency call mode to enter the normal mode in accordance with an operation signal received from the base station 30, thereby improving the operability of the wireless device 10.

Although the first and second embodiments of the present application have been described in the foregoing, the present application is not limited to the first and second embodiments described above.

A wireless device according to the present application has an action mode that automatically repeats, at a fixed temporal interval, a sending action of sending a voice and a receiving action of receiving the voice. When the voice is input during execution of the action mode, by recording and sending the input voice, the wireless device can transmit a status of a sender to a receiver, while reducing a load on the sender in a case of emergency.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless device having a normal action mode that performs a sending action of sending a voice, a receiving action of receiving the voice separately, and an emergency call mode that automatically switches, at a fixed temporal interval, between the sending action and the receiving action, repeatedly comprising:

a voice recorder configured to record the voice therein as a voice data when the voice is detected with a microphone during a period of the sending action or the receiving action;

a sending controller configured to send the recorded voice data during a period of the sending action in the emergency call mode; and a recording controller configured to control recording in the voice recorder, wherein the sending controller is further configured to repeatedly send the voice data recorded in the voice recorder when a new voice is not detected with the microphone for a predetermined time from a start of the sending action during the period of the sending action in the emergency call mode.

2. The wireless device according to claim 1, wherein the recording controller is further configured to record a new voice data of a new voice detected with the microphone in the voice recorder to replace the voice data previously recorded in the voice recorder in the emergency call mode.

3. The wireless device according to claim 1, wherein the recording controller is further configured to add a new voice data of a new voice detected with the microphone to the previously recorded voice data in the voice recorder in the emergency call mode, and the sending controller is further configured to sequentially reproduce and send the recorded voice data in recorded order in the emergency call mode.

4. The wireless device according to claim 1, further comprising a voice input determination unit configured to determine, when detecting the voice having a level equal to or larger than a predetermined threshold, that the voice is detected with the microphone.

5. The wireless device according to claim 1, wherein, the recording controller is further configured to delete at least a part of the voice data recorded in the voice recorder or stop recording the voice data in the voice recorder based on a signal from an external apparatus in the emergency call mode.

6. The wireless device according to claim 1, wherein the emergency call mode ends based on a signal from an external apparatus.

7. The wireless device according to claim 2, further comprising a voice input determination unit configured to determine, when detecting the voice having a level equal to or larger than a predetermined threshold, that the voice is detected with the microphone.

8. A wireless method having a normal action mode that perform a sending action of sending a voice and a receiving action of receiving the voice separately and an emergency call action mode that automatically switches, at a fixed temporal interval, between the sending action and the receiving action repeatedly comprising:

recording the voice as a voice data when the voice is detected with a microphone during a period of the sending action or the receiving action;

sending the recorded voice data during a period of the sending action in the emergency call mode; and controlling the recording, further comprising:

sending the recorded voice data repeatedly when a new voice is not detected with the microphone for a predetermined time from a start of the sending action during the period of the sending action in the emergency call mode.

* * * * *